Figs. 6 and 7, one modified form of gearing is shown in which the tie chain 29a encompasses a series of sprockets 30a. These sprockets 30a through the tie chain drive a gear 33a which in turn is connected by gearing 34a to drive a small sprocket 35a. The parts thus far described correspond to the similar elements of the preferred form of invention described above. Sprocket 35a is keyed to a shaft which is freely rotatable in a projection or housing 36a on the frame housing of the unit to be wound. Also keyed on this shaft is a bevel gear 60. This gear 60 is mutilated to provide sections of teeth 61 at spaced intervals about its circumference and corresponds in function to the chain 43 and the gear fragment 45, above described. Each spring housing in the unit to be wound is provided with an extension 39a having a gear 65 keyed to its outer end so that movement of the gear 65 will give a corresponding movement or rotation of its spring housing. Adjacent each gear 65 and in mesh therewith is a worm 64 having a projecting stub extending therefrom. A beveled gear 62 is mounted on the end of each worm stub. It will be obvious then that rotation of the bevel gear 60 will effect an intermittent or periodic rotation of the spring housings to wind the springs therein in a manner very similar to that described with respect to Figs. 1 to 5.

It should be noted that when a worm drive of this nature is used that the sizes of the sprockets and gears are suitably proportioned and will be of a different size from those used in a complete chain gearing, as described with reference to Figs. 1 to 5.

Unit 1, is in the nature of a master unit and as stated above, can be energized by any desired manner of winding. When thus energized and geared to the remaining units which are already wound to their normal degree and with each succeeding unit geared to increase the speed at a differential of three to one, it will be seen that the thirteenth unit will be made to travel many times faster than unit 1. Unit 13, being the high rotating unit, furnishes the drive shaft or intermediate source of power for work to be done. Power can be taken off of the shaft 51, which is in all respects similar to the shaft 32.

Obviously, if desired, suitable gearing from the shaft 51 to an idler shaft located at any desired point on the frame housing of unit 13 would provide a different location for the power take-off.

The speed of this unit 13 is controlled by the load pull and the developed H. P.

From the foregoing, it is believed that the operation of the device will be clear.

For the sake of illustration only, it will be assumed that the present motor is based on a structure capable of producing usuable energy to the equivalent of three H. P. To obtain this result, unit 1 will have stored in each of its twelve drums energy equivalent to 3¼ H. P. and the twelve drums will store a total of approximately 39 H. P. Unit 2 then will have slightly less power stored up, namely, 3 H. P. per housing or 36 H. P. for the unit. With a reduction of one quarter H. P. per drum, for succeeding units, it will be seen that the last unit, 13, will have drums each effective to store one-quarter of a H. P., or a total of 3 H. P. for the unit. Figured out, the total of stored energy in the thirteen units is equal to 273 H. P. By keeping this energy stored for release from unit 13 at the rate of 3 H. P., the motor will run for a considerable period of time, and by periodically restoring energy to the motor, through the medium of winding the springs in unit No. 1, a continuous flow of uninterrupted power will be obtained at the expense of the comparatively little effort necessitated to rewind the initial set of springs.

In other words, considering the entire motor as having all springs initially wound, as the springs in unit 13 give off energy, they will receive energy stored up in unit 12 at a proper rate of rewinding due to the gearing therebetween. Unit 12 in turn will receive energy from unit 11 and so on back to unit 1. The springs in unit 1 may be wound as necessary by the application of power to the shaft ends 50, these ends being projections of the spring housings 20 in unit 1 arranged similar to the projections 39 of the remaining units.

No one of the thirteen units really loses energy except unit 1, the remaining twelve units being kept in a normal wound condition by power transmitted from unit 1 and in turn from one unit to another down the line. With the proper proportions, unit 1 will retain sufficient energy in its springs to make six turns. For the first three turns, it will give off equal energy with the remainder of the units, taking approximately sixteen hours to make the three turns. In the present example it is assumed, of course, that the load pull is such as to secure a rate of speed which will require sixteen hours to make the three turns. The remaining three turns, if there is no rewinding of unit 1, will be sufficient to keep unit 2 rewound until such time as the energy in unit 1 is entirely spent. Unit 2 acts in the same manner, retaining the same effective length of spring as unit 1 and acting the same way in giving off its energy for three turns. Still assuming that there is no rewinding of unit 1, after the energy of unit 1 is spent, unit 2 will be left with sufficient energy to operate the remaining units for a while, and the same condition is true for the remaining units. It is to be noted that because the units are operating simultaneously and the output of power is kept at a reasonable figure, such as 3 H. P., that instead of giving off a tremendous amount of power

toluidine are diazotized and combined with a concentrated solution of 11.6 parts of resorcinol, to which after some time sodium acetate is added for almost neutralizing the mineral acid. The new dyestuff is isolated as described above. It corresponds probably to the formula:

acetylacetone, water soluble basic dyestuffs of similar properties are obtained.

When starting from the equivalent quantity of the dyestuff: primuline-azo-acetoacetic acid anilide, a dyestuff of similar properties is obtained, containing a dithiazol-complex in its molecule.

*Example 7*

site direction, and means on said shaft externally of said drum providing a power take off for energy produced by said spring means, and means connecting said power take off means to the drum of another of said frame housings whereby said produced energy will be effective to rotate said last mentioned drum and wind the spring means therein.

17. In a motor of the type described, a plurality of frame housings, a plurality of spring drums in each of said housings, a shaft rotatably mounted in each of said drums, and spring means in each of said drums connected at one end to its respective drum shaft and at the other end to the interior of said drums, means to rotate the several drums of one of said frame housings, in one direction to wind the spring means therein, means to hold said drums against rotation in the opposite direction, and means on each drum shaft externally of said drums providing a power take-off for energy produced by said spring means of each drum, and means connecting said shafts to an ultimate power take off member whereby the sum of the power developed by the several units may be utilized, and means connecting said ultimate power take off means to the drums of another of said frame housings, whereby said produced energy will be effective to rotate said last mentioned drums and wind the spring means therein.

18. In a motor of the type described, a plurality of frame housings, a plurality of spring drums in each of said housings, a shaft rotatably mounted in each of said drums, and spring means in each of said drums connected at one end to its respective drum shaft and at the other end to the interior of said drums, means to rotate the several drums of one of said frame housings, in one direction to wind the spring means therein, means to hold said drums against rotation in the opposite direction, and means on each drum shaft externally of said drums providing a power take off for energy produced by said spring means of each drum, means connecting said shafts to an ultimate power take off member whereby the sum of the power developed by the several units may be utilized, and means to connect said ultimate power take off means to the drums of another of said frame housings one at a time, whereby said produced energy will be effective to rotate said last mentioned drums and wind the spring means therein.

19. In a motor of the type described, a plurality of frame housings, spring drums rotatably supported respectively in each of said housings, a shaft mounted in each of said drums for relative rotation therein, and spring means in said drum arranged to rotate its shaft relative to the drum, means on said shaft externally of said drum providing a power take off for energy produced by said spring means, and means connecting said power take off means to the drum of another of said frame housings, whereby said produced energy will be effective to rotate said last mentioned drums.

20. In a motor of the type described, a plurality of frame housings, a plurality of spring drums rotatably supported respectively in each of said housings, a shaft mounted in each of said drums for relative rotation therein, spring means in said drum arranged to rotate its respective shaft relative to the drum, and means on each drum shaft externally of said drum providing a power take off for energy produced by said spring means of each drum, means connecting said shafts to an ultimate power take off member whereby the sum of the power developed by the several units may be utilized, and means connecting said ultimate power take off means to the drums on another of said frame housings whereby said produced energy will be effective to rotate said last mentioned drums.

21. In a motor of the type described, the combination of a plurality of frame housings, a plurality of spring drums rotatably mounted in each of said housings, a shaft mounted in each of said drums for relative rotation therewith, spring means connecting each shaft with its respective drum, means to wind the spring in the drum of one unit while the respective spring shaft is releasing energy stored in the spring and means connecting the shafts of one frame housing to the drums of an adjacent frame housing, whereby the energy of the springs and shafts of the first mentioned housing will be utilized to produce a winding moment on the drums of said adjacent housing, while the shafts in the drums of the latter housing are being rotated by their respective spring means.

22. In a motor of the type described, the combination of a plurality of units, each comprising a plurality of spring drums, means to wind the spring drums of one unit of the motor and means to transmit such energy as will be stored in said unit upon winding thereof, to adjacent units, thereby to affect the winding of the spring drums in subsequent units and means to take off the energy transmitted through the drums by successive windings thereof at the other end of the motor.

In testimony whereof I affix my signature.

GEORGE O. JOYNER.